United States Patent [19]
Ejk

[11] 4,132,691
[45] Jan. 2, 1979

[54] LUBRICANT COMPOSITION FOR VINYL CHLORIDE POLYMERS

[75] Inventor: Adam J. Ejk, Piscataway, N.J.

[73] Assignee: M&T Chemical Inc., Stamford, Conn.

[21] Appl. No.: 784,961

[22] Filed: Apr. 6, 1977

[51] Int. Cl.$^2$ .............................................. C08K 5/09
[52] U.S. Cl. ........................ 260/23 XA; 260/28.5 D; 260/42.49; 260/45.7 R; 260/45.75 R; 260/45.75 S; 260/45.75 B; 260/45.75 W
[58] Field of Search ................... 260/28.5 D, 45.7 R, 260/45.75 S, 23 XA, 42.49, 45.75 W, 45.75 B, 45.75 R; 252/400 R

[56] References Cited

U.S. PATENT DOCUMENTS

| 2,855,266 | 10/1958 | James | 260/42.49 |
| 3,172,801 | 3/1965 | Cantelow | 260/28.5 R |
| 3,757,001 | 9/1973 | Reiter et al. | 260/28.5 D |
| 3,760,036 | 9/1973 | Matthews | 260/28.5 D |
| 3,979,347 | 9/1976 | Brotz et al. | 260/28.5 D |

*Primary Examiner*—V. P. Hoke
*Attorney, Agent, or Firm*—Kenneth G. Wheeless; Robert Spector

[57] ABSTRACT

The combination of a polar lubricant such as an oxidized polyethylene wax and an oxide or hydroxide of specified elements not only improves the processability of rigid vinyl chloride polymers but also imparts an unexpectedly high level of heat stability.

11 Claims, No Drawings

LUBRICANT COMPOSITION FOR VINYL CHLORIDE POLYMERS

BACKGROUND OF THE INVENTION

This invention relates to additives for improving the processability of vinyl chloride polymer compositions. This invention further relates to lubricants which stabilize the rheological properties, particularly the melt viscosity, of molten vinyl chloride polymers.

Paraffin and polyethylene waxes are conventionally employed as lubricants for rigid vinyl chloride polymer compositions. It is well known to use these lubricants in combination with salts of stearic acid or other fatty acids containing from 8 to about 20 carbon atoms to control rheological properties and impart stability during processing of rigid vinyl chloride polymers. In the absence of a stabilizer vinyl chloride polymers degrade readily at the high temperatures required to process these materials. This degradation may appear as an increase in melt viscosity, which may or may not be accompanied by discoloration. It is believed that the discoloration results from a conjugated series of double bonds between adjacent carbon atoms of the polymer chains. Metal salts of fatty acids may be less than desirable additives when the polymer remains molten for extended periods of time, since they often contribute to an increase in melt viscosity during the initial stages of polymer degradation. Any disruption of laminar flow in the processing equipment could cause a portion of the polymer stream to degrade slightly, resulting in a melt viscosity increase within that portion of the polymer. The lower viscosity material on the upstream side of the slower moving, more viscous portion would eventually force its way around and through the slower moving portion and appear as light colored spots or streaks in the final shaped product.

It is an objective of this invention to define improved lubricant systems which not only facilitate processing of vinyl chloride polymers but, in addition, function as melt viscosity and color stabilizers for these polymers and are compatible with conventional heat stabilizers, including organotin compounds and alkaline earth metal salts of fatty acids.

SUMMARY OF THE INVENTION

This invention provides an improved additive for imparting lubricity and heat stability to a rigid vinyl chloride polymer composition, said additive consisting essentially of a mixture comprising an organic wax and a compound derived from a metallic element. The improvement resides in (1) said compound being selected from the group consisting of oxides and hydroxides of tin, antimony and the elements in groups IIa, IIIa and IVb, and (2) said organic wax being selected from the group consisting of oxidized polyethylene, copolymers of ethylene with monoethylenically unsaturated carboxylic acids or esters thereof and esters derived from monomeric or oligomeric monocarboxylic and dicarboxylic acids containing from 8 to 20 carbon atoms and alcohols containing from 1 to 12 carbon atoms. The concentration of free carboxylic acid or ester groups in said additive is from 0.03 to 0.5 equivalents of carboxylic acid or ester per 100 grams of said rigid vinyl chloride polymer and the concentration of the oxide or hydroxide is from 0.1 to 5 parts per 100 parts of said rigid vinyl chloride polymer. The amount of oxide or hydroxide is in excess of the stoichiometric amount required to react with said carboxylic acid or ester.

DETAILED DESCRIPTION OF THE INVENTION

The novel feature of this invention resides in the combination of an oxide or hydroxide of tin, antimony or an element from group IIa, IIIa or IVb of the periodic table with a polar lubricant that is either a polymeric wax containing free carboxylic acid or ester groups or an ester of a fatty acid. The amount of oxide or hydroxide employed is considerably in excess of that required to react with the acid or ester groups present in the lubricant.

Lubricants suitable for use in the compositions of this invention include polymers of ethylene, or other suitable olefins, which contain free carboxylic acid or ester groups. Carboxylic acid groups can be introduced by oxidation of a homopolymer derived from an olefin such as ethylene. Depending upon the extent of oxidation, the resultant polymer exhibits an acid number of 10 to about 30. The term acid number is defined as the number of milligrams of potassium hydroxide required to neutralize one gram of the material. Alternatively, acid or ester groups can be introduced by copolymerization of an olefin with either an ethylenically unsaturated carboxylic acid such as acrylic or methacrylic acid or an ester of the acid, such as ethyl acrylate. These copolymers are commercially available and exhibit acid or saponification numbers of from about 10 to 75. A saponification number has the same definition as an acid number, but is applied to esters rather than the corresponding free acids. Copolymers of ethylene with vinyl esters such as vinyl acetate are also suitable.

The aforementioned polymeric waxes exhibit a relatively low molecular weight, usually between 2,000 and 15,000.

Other suitable polar lubricants that can be employed in place of the polymeric waxes are esters derived from the so called "fatty acids", which include mono- or dicarboxylic acids containing from 12 to about 20 carbon atoms, with alcohols containing from 1 to about 12 carbon atoms. Dimers and trimers obtained by the controlled polymerization of unsaturated monocarboxylic acids are also suitable starting materials for esters. These acids are commercialls available, and are referred to as "dimer acids" and "trimer acids".

The combination of the metal oxide or hydroxide with the polar lubricant appears to be synergistic, in that the level of melt viscosity and color stability imparted to a vinyl chloride polymer by the combination is higher than can be achieved using either the metal compound or lubricant alone at a concentration equal to that of the combination. The accompanying examples demonstrate that this effect is not obtained using conventional paraffin type waxes or lubricants such as calcium stearate. These conventional lubricants can be used in combination with the present polar materials to obtain both the desired lubricity and acid content in the polymer formulation.

The present lubricant compositions are compatible with virtually all of the known heat stabilizers for vinyl chloride polymers. One of the major classes of heat stabilizers are the organotin compounds represented by the generic formulae

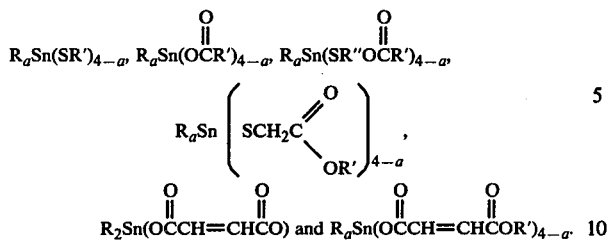

$$R_2Sn(OCCH=CHCO) \text{ and } R_aSn(OCCH=CHCOR')_{4-a}.$$

In the foregoing formulae R and R' are each a monovalent hydrocarbon radical, usually alkyl, and contain from 1 to 12 carbon atoms, and R'' is an alkylene radical containing from 2 to 8 carbon atoms. Preferably R is methyl, butyl or octyl. R' is isooctyl or lauryl and R'' is ethylene. The subscript "a" represents the integer 1 or 2. Other useful organotin compounds include those containing two or more tin atoms wherein the tin atoms are joined to one another by sulfur. A preferred example of such a compound is represented by the formula

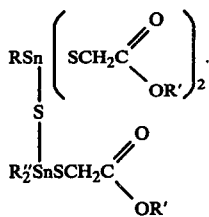

The R and R' groups are the same in the preceding formulae. R'' is selected from the same group as R but need not be the same as R.

Other classes of compounds which have been used as heat stabilizers for vinyl chloride polymers are salts of carboxylic acids containing from 8 to about 20 carbon atoms with alkaline earth metals, particularly calcium and barium. These salts can be used alone or in combination with salts of the same carboxylic acids and elements from group IIb of the periodic table, particularly zinc and cadmium.

A more complete discussion of suitable heat stabilizers for vinyl chloride polymers is contained in a text entitled "The Stabilization of Polyvinyl Chloride" by F. Chevasaus and R. de Broutelles. As previously disclosed, the present lubricant compositions should be compatible with most if not all of these heat stabilizers. Since the present lubricant compositions have been shown to delay the appearance of initial discoloration during processing of molten vinyl chloride polymers, less of the conventional heat stabilizer should be required than in formulations containing prior art lubricants such as calcium stearate and paraffin waxes.

The amount of polar lubricant present in the final polymer formulation is dependent upon the acid or saponification number of the lubricant. From 0.03 to about 0.5 equivalents of carboxylic acid

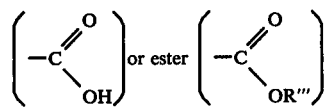

groups are present per 100 grams of vinyl chloride polymer. The formulation also contains an oxide or hydroxide of antimony or an element from group IIa, IIIa or IVb of the periodic table at a concentration of from 0.1 to 5%, based on the weight of vinyl chloride polymer. Among the preferred basic compounds for use in the present lubricant compositions are calcium oxide, calcium hydroxide, barium hydroxide, strontium hydroxide, zirconium hydroxide, aluminum hydroxide and antimony trioxide. The oxides of zinc and lead are not suitable, since they adversely affect the heat stability of vinyl chloride polymers, and would therefore not be useful at the levels required to obtain the improved stability that characterize the present lubricant compositions.

As used in this specification the term "vinyl chloride polymer" includes vinyl chloride homopolymers and copolymers wherein the major component is vinyl chloride and the remainder is one or more ethylenically unsaturated compounds that are copolymerizable with vinyl chloride. Useful comonomers include vinylidene chloride, vinyl acetate and esters of ethylenically unsaturated carboxylic acids, such as acrylic and methacrylic acids.

The following examples represent preferred embodiments of the present lubricant compositions and should not be interpretted as limiting the scope of the invention defined in the accompanying claims. All parts and percentages are by weight unless otherwise stated.

EXAMPLE 1

This example demonstrates the improvement in melt viscosity stabilization, relative to prior art lubricants, that can be achieved using the present lubricant compositions. The data contained in this example and all subsequent examples, unless otherwise specified, were obtained using a Braebender ® torque rheometer. The mixing chamber was maintained at a temperature of 200° C. and the speed of the faster moving of the two mixing blades was 60 revolutions per minute. Each sample weighed 62 grams.

The melt viscosity of the samples was measured in terms of the torque (in meter grams) applied by the motor to maintain the aforementioned mixing blade at a constant speed of 60 r.p.m. Samples of the polymer were withdrawn at two minute intervals for color ratings.

Each of the formulations contained 100 parts by weight of a vinyl chloride homopolymer, 3 parts of calcium carbonate coated with a thin film of stearic acid, 1 part of titanium dioxide, 1 part of a paraffin wax (m.p. = 165° C.) and 0.6 part of dibutyltin-S,S'-bis(isooctyl mercaptoacetate), a known, efficacious heat stabilizer. The variables in the formulation together with the torque readings taken at three minute intervals from a recorder chart are set forth in the following tables. Samples 1, 2 and 3 are controls.

|  | Formulation No. | | | |
|---|---|---|---|---|
| Ingredient (parts) | 1 | 2 | 3 | 4 |
| Calcium stearate | 0.4 | 0 | 0 | 0 |
| Oxidized polyethylene* | 0.2 | 0.4 | 0 | 0.4 |
| Calcium hydroxide | 0 | 0 | 0.2 | 0.2 |

*acid number = 15, density = 0.93 g./cc., viscosity at 140° C (Brookfield) = 200 centipoises

| Residence Time in | Torque (in meter grams) | | | |
|---|---|---|---|---|
| Torque Rheometer (min.) | 1 | 2* | 3 | 4 |
| 0 | 2260 | 1890 | 2980 | 1760 |

-continued

| Residence Time in Torque Rheometer (min.) | Torque (in meter grams) | | | |
|---|---|---|---|---|
| | 1 | 2* | 3 | 4 |
| 3 | 2100 | 1780 | 2380 | 1720 |
| 6 | 1880 | 1690 | 2160 | 1690 |
| 9 | 1720 | 1690 | 2110 | 1650 |
| 12 | 1750 | 1690 | 2190 | 1650 |
| 15 | 1780 | 1695 | 2280 | 1650 |
| 18 | 1800 | 1700 | — | 1655 |

*Discoloration occurred earlier than in samples 1, 3 and 4.

The times (in minutes) required for each of the formulations to fuse and crosslink, together with the period during which the torque required to mix the molten polymer remained constant are summarized in the following table.

| | Formulation No. | | | |
|---|---|---|---|---|
| | 1 | 2 | 3 | 4 |
| Fusion time (min.) | 3.0 | 4.8 | 1.3 | 5.2 |
| Crosslink time (min.) | 13.0 | 16.9 | 10.0 | 21.0 |
| Period of constant torque (min.) | 10.0 | 12.1 | 8.7 | 15.8 |

The foregoing data demonstrate that Formulation 4, the only one containing both calcium hydroxide and oxidized polyethylene, exhibited the lowest melt viscosity and the best long-term stability.

EXAMPLE 2

The effectiveness of the present lubricant compositions as costabilizers for vinyl chloride polymers in combination with a conventional diorganotin stabilizer, dibutyltin-S,S'-bis(isooctyl mercaptoacetate), was determined using a Braebender ® torque rheometer and the operating conditions described in the preceding example. This evaluation was conducted by noting the color of the samples that were withdrawn at two minute intervals. The base formulation was identical to that employed in Example 1, except that the paraffin wax was present at a level of 0.5 part. The variables in each of the three formulations tested are set forth in the following table together with the color of the samples obtained during the heat stability test.

| Ingredient (parts) | Formulation No. | | |
|---|---|---|---|
| | 1 | 2 | 3 |
| Oxidized polyethylene (Ex. 1) | 0.7 | 0 | 0.4 |
| Calcium hydroxide | 0 | 0.7 | 0.3 |
| Heat Exposure Time (min.)* | | | |
| 0 | white | white | white |
| 2 | light yellow | yellow | light yellow |
| 4 | yellow | dark yellow | yellow |
| 6 | tan | dark tan | dark yellow |
| 8 | brown | brown | tan |
| 10 | dark brown | dark brown | light brown |
| 12 | dark brown | — | brown |

*Measured from the time of initial fusion.

The data from the foregoing heat stability test demonstrate that the combination of a polar lubricant and calcium hydroxide not only improves processability of vinyl chloride polymers but also significantly improves the heat stability of these materials thereby reducing the level of heat stabilizer required in the formulation.

EXAMPLE 3

An evaluation was conducted to determine the effect of varying the levels of the metal oxide or hydroxide and the polar lubricant. Torque rheometer studies at 200° C. and 60 r.p.m. using 62 g. samples were used to evaluate formulations containing 100 parts vinyl chloride homopolymer, 3 parts stearic acid-treated calcium carbonate, 1 part titanium dioxide, 0.5 part paraffin wax and 0.6 part dibutyltin S,S'-bis(isooctyl mercaptoacetate). The amounts of calcium hydroxide and oxidized polyethylene present in each of the formulations together with the colors observed during the heat stability test are recorded in the following tables. The time at which the formulation initially fuses is employed as the reference point (0 minutes) for the heat stability test. The time of initial fusion is that point on the torque vs. time plot at which the torque first attains a steady state value, which gradually increases as degradation of the polymer occurs, resulting in crosslinking and an increase in melt viscosity.

| Ingredient (parts) | Formulation No. | | | | |
|---|---|---|---|---|---|
| | 1 | 2 | 3 | 4 | 5 |
| Oxidized polyethylene (Ex. 1) | 0.7 | 0.7 | 0.7 | 0.7 | 0.7 |
| Calcium hydroxide | 0 | 0.1 | 0.3 | 0.8 | 1.2 |
| Heat Exposure Time (min.) | | | | | |
| 0 | white | | | | |
| 2 | light yellow | light yellow | light yellow | light yellow | light yellow |
| 4 | yellow | yellow | yellow | yellow | yellow |
| 6 | tan | light tan | dark yellow | yellow | yellow |
| 8 | brown | light brown | tan | dark yellow | yellow |
| 10 | dark brown | dark brown | light brown | light tan | light tan |
| 12 | dark brown | dark brown | dark brown | tan | tan |
| 14 | — | — | — | tan | tan |
| 16 | — | — | — | brown | tan |
| Ingredient (parts) | Formulation No. | | | | |
| | 6 | 7 | 8 | 9 | 10 | 11 |
| Calcium hydroxide | 0.3 | 0.3 | 0.3 | 0.3 | 0.3 | 0.3 |
| Oxidized polyethylene (Ex. 1) | 0.0 | 0.1 | 0.4 | 0.7 | 1.0 | 1.2 |
| Heat Exposure Time (min.) | | | | | | |
| 0 | white | white | white | white | white | white |
| 2 | yellow | yellow | light yellow | light yellow | light yellow | light yellow |
| 4 | dark yellow | dark yellow | yellow | yellow | yellow | yellow |
| 6 | brown | tan | dark yellow | dark yellow | dark yellow | dark yellow |
| 8 | dark brown | brown | tan | tan | light tan | light tan |
| 10 | dark brown | dark brown | light brown | light brown | tan | tan |
| 12 | dark brown | dark brown | brown | dark brown | brown | brown |
| 14 | — | — | — | — | dark brown | brown |

The rate of discoloration is significantly reduced by the presence of even minor amounts of oxidized polyethylene or calcium hydroxide to formulations containing the second component of the present lubricant compositions. The data also demonstrate that the metal oxide or hydroxide is effective in the range from about 0.1 to 1.0 part per 100 parts of vinyl chloride polymer, the preferred range being from 0.1 to 0.5 part. There is no improvement in delaying of discoloration and only a marginal improvement in long-term heat stability at concentrations above 1.0 part.

The polar lubricant is effective at concentrations from 0.1 to 1.0 part per 100 parts of polymer. At higher levels the excessive lubricity would make the polymer composition difficult to process or cause it to lose coherency.

EXAMPLE 4

This example demonstrates that polar lubricants with acid numbers from 7 to 40 are suitable for use in the present lubricant compositions. Each formulation contained 100 parts vinyl chloride homopolymer, 3.0 parts stearic acid-treated calcium carbonate, 1.0 part of titanium dioxide, 0.5 part of a paraffin wax and 0.6 part dibutyltin-S,S'-bis(isooctyl mercaptoacetate). Calcium hydroxide at a level of 0.3 part was employed in combination with each of the following lubricants:

(1) Oxidized polyethylene having an acid number of 15 and a melt viscosity (Brookfield) of 200 centipoises at 140° C.
(2) A copolymer of ethylene and an ethylenically unsaturated carboxylic acid (available as AC-540 from Allied Chemical Corp.), acid number = 40, viscosity (Brookfield) = 500 centipoises at 140° C.
(3) An oxidized polyethylene exhibiting an acid number of 7 and a melt viscosity (Brookfield) of 230 centipoises at 125° C.
(4) A non-oxidized polyethylene wax (acid number = 0) available as Epolene N-14P from Eastman Chemical Products, Inc.

The waxes are identified by their corresponding number (1–4) in the following table. The formulations were evaluated using a Braebender ® torque rheometer operating under the conditions described in the preceding Example 1.

| Lubricant Composition | Parts of Lubricant | | | | |
|---|---|---|---|---|---|
| | 1 | 2 | 3 | 4 | 5 (control) |
| 1 | 0.7 | 0.7 | — | — | — |
| 2 | — | — | 0.4 | — | — |
| 3 | — | — | — | 1.4 | — |
| 4 | — | — | — | — | 0.7 |
| Calcium hydroxide | 0 | 0.3 | 0.3 | 0.3 | 0.3 |
| Heating Time (min.)* | Color of Formulation | | | | |
| 0 | white | white | white | white | white |
| 2 | light yellow | light yellow | light yellow | light yellow | light yellow |
| 4 | yellow | yellow | yellow | yellow | dark yellow |
| 6 | tan | dark yellow | dark yellow | yellow | tan |
| 8 | brown | tan | tan | light tan | brown |
| 10 | dark brown | light brown | brown | tan | dark brown |
| 12 | dark brown | dark brown | dark brown | brown | dark brown |

*Measured from time of initial fusion.

The relatively poor performance of Formulation 5, a control containing a non-polar lubricant (non-oxidized polyethylene) demonstrates the synergistic improvement in heat stability that is achieved using the present lubricant compositions.

The effect of the lubricant on the rheological properties of the polymer composition was demonstrated by observing the time required for the formulation to fuse and the equilibrium torque value (the torque value of the molten polymer between initial fusion and the onset of degradation, as evidenced by an increase in the torque value).

| Formulation | Fusion Time (min.) | Equilibrium Torque (meter grams) |
|---|---|---|
| 2 | 4.3 | 1900 |
| 5 | 5.9 | 2020 |

EXAMPLE 5

This example demonstrates the improvement in heat stability obtained using representative metal oxides and hydroxides within the scope of this invention in vinyl chloride polymer formulations containing a polar lubricant.

The heat stability evaluations were performed using a Braebender ® torque rheometer. The operating conditions are described in Example 1. Each formulation contained 100 parts of vinyl chloride homopolymer, 3.0 g. of stearic acid-treated calcium carbonate, 1.0 g. of titanium dioxide, 0.5 part of a paraffix wax lubricant and 0.6 part dibutyltin-S,S'-bis(isooctyl mercaptoacetate). The remaining ingredients in each of the sixteen formulations tested and the colors observed during the heat stability test are set forth in the following table. Samples of each formulation were removed from the torque rheometer at two minute intervals following initial fusion of the formulation. The color of the formulation at the time of fusion was also observed and is recorded as the color observed at 0 minutes heating time.

| Ingredient | Parts | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 15 |
| Oxidized polyethylene (Ex. 1) | 0.7 | 0.7 | — | 0.7 | — | 0.7 | — | 0.7 | — | 0.7 | — | 0.7 | — | 0.7 | 0.7 | 0.7 |
| Calcium hydroxide | 0.3 | — | — | — | — | — | — | — | — | — | — | — | — | — | — | — |
| Magnesium hydroxide | — | 0.3 | 0.3 | — | — | — | — | — | — | — | — | — | — | — | — | — |
| Calcium oxide | — | — | — | 0.2 | 0.2 | — | — | — | — | — | — | — | — | — | — | — |
| Strontium hydroxide | — | — | — | — | — | 0.2 | 0.2 | — | — | — | — | — | — | — | — | — |
| Barium hydroxide* | — | — | — | — | — | — | — | 0.2 | 0.2 | — | — | — | — | — | — | — |
| Zirconium hydroxide | — | — | — | — | — | — | — | — | — | 0.2 | 0.2 | — | — | — | — | — |
| Aluminum hydroxide | — | — | — | — | — | — | — | — | — | — | — | 0.3 | 0.3 | — | — | — |
| Antimony trioxide | — | — | — | — | — | — | — | — | — | — | — | — | — | 0.3 | — | — |
| Zinc oxide (control) | — | — | — | — | — | — | — | — | — | — | — | — | — | — | 0.2 | — |
| Lead oxide (control) | — | — | — | — | — | — | — | — | — | — | — | — | — | — | — | 0.2 |

*As the monohydrate

| Heat Exposure Time (minutes) | Color of Sample | | | | | | | |
|---|---|---|---|---|---|---|---|---|
| | 1 | 2 | 3 | 4 | 5 | 6 | 7 | 8 |

-continued

| Heat Exposure Time (minutes) | 1 | 2 | 3 | 4 | 5 | 6 | 7 | 8 |
|---|---|---|---|---|---|---|---|---|
| 0 | white | white | white | white | white | white | white | white |
| 2 | light yellow | light yellow | yellow | light yellow | yellow | light yellow | yellow | light yellow |
| 4 | yellow | yellow | tan | yellow | light yellow | yellow | dark yellow | yellow |
| 6 | dark yellow | dark yellow | brown | light tan | brown | dark yellow | brown | light tan |
| 8 | tan | tan | dark brown | light brown | dark brown | tan | dark brown | tan |
| 10 | light brown | light brown | — | brown | — | light brown | — | light brown |
| 12 | dark brown | dark brown | — | dark brown | — | brown | — | brown |

Color of Sample

| Heat Exposure Time (minutes) | 9 | 10 | 11 | 12 | 13 | 14 | 15 | 16 |
|---|---|---|---|---|---|---|---|---|
| 0 | white | white | white | white | white | white | white | gray |
| 2 | yellow | light yellow | yellow | light yellow | yellow | light yellow | light yellow | gray |
| 4 | tan | yellow | tan | yellow | dark tan | yellow | light yellow | gray |
| 6 | brown | light tan | brown | light tan | brown | dark yellow | black | dark gray |
| 8 | dark brown | dark tan | dark brown | brown | dark brown | light tan | — | brown |
| 10 | — | brown | — | dark brown | — | tan | — | brown |
| 12 | — | dark brown | — | — | — | brown | — | dark brown |

Essentially, all of the metal oxides or metal hydroxides, with the exception of the zinc oxide and lead oxide controls, exhibited the same type of synergistic improvement in heat stability with the polar lubricant as did calcium hydroxide. The premature discoloration observed with zinc oxide is characteristic of zinc compounds in vinyl chloride polymer formulations. This same type of effect, but to a lesser extent, is observed with cadmium compounds. Oxides or hydroxides of these two metals would be useful only at very low levels and therefore do not form part of the present invention.

The gray color imparted to the formulation containing lead oxide is the result of a reaction between the oxide and the sulfur present in the organotin compound to yield lead sulfide. Of course, any highly colored metal oxide or hydroxide will act as a pigment and impart its respective color to the formulation. The stability of the compound will be improved, but at a given pigmentation level.

The reaction between a metal oxide or hydroxide and a particular heat stabilizer, such as the aforementioned organotin compound, can be eliminated by changing the stabilizer.

What is claimed is:

1. An improved rigid vinyl chloride polymer composition comprising an effective amount of a heat stabilizer for vinyl chloride polymers, a vinyl chloride polymer and an effective amount of an additive for imparting lubricity and additional heat stability to said composition, wherein the improvement resides in said additive being a synergistically active mixture of (1) an organic wax selected from the group consisting of oxidized polyethylene, copolymers of ethylene with monoethylenically unsaturated carboxylic acids or esters thereof and esters derived from (a) monocarboxylic acids containing from 8 to 20 carbon atoms and (b) alcohols containing from 1 to 12 carbon atoms, the concentration of free carboxylic acid or ester groups in said organic wax being from 0.03 to 0.5 equivalent weight of said acid or ester per 100 grams of vinyl chloride polymer, and (2) a basic compound selected from the group consisting of oxides and hydroxides of tin, antimony and elements in groups II-A, III-A, and IV-B of the periodic table of the elements, the concentration of said basic compound being from 0.1 to 5 parts by weight per 100 parts of said vinyl chloride polymer and in excess of the stoichiometric amount required to react with the carboxylic acid or ester groups present in said organic wax.

2. An improved composition according to claim 1 wherein said heat stabilizer is an organotin compound.

3. An improved composition according to claim 2 wherein said organotin compound is represented by a general formula selected from the group consisting of

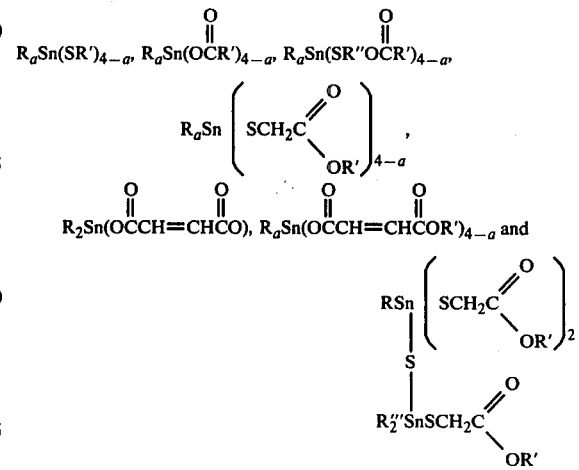

wherein R, R' and R" each alkyl and contain from 1 to 12 carbon atoms, R" is alkylene and contains from 2 to 8 carbon atoms and a is 1 or 2.

4. An improved composition according to claim 1 wherein said heat stabilizer is an alkaline earth metal salt of a carboxylic acid containing from 8 to 20 carbon atoms.

5. An improved composition according to claim 1 wherein the basic compound is selected from the group consisting of calcium hydroxide, calcium oxide, magnesium oxide, strontium hydroxide, barium hydroxide, zirconium hydroxide, aluminum hydroxide and antimony trioxide.

6. An improved composition according to claim 1 wherein the organic wax is an oxidized polyethylene or a copolymer of ethylene with an ethylenically unsaturated acid.

7. An improved composition according to claim 1 wherein said vinyl chloride polymer composition contains a paraffin wax as an auxiliary lubricant.

8. An improved composition according to claim 1 wherein said vinyl chloride polymer composition contains an alkaline earth metal carbonate as a filler for said vinyl chloride polymer.

9. An improved composition according to claim 1 wherein said vinyl chloride polymer composition contains a pigment.

10. An improved composition according to claim 9 wherein said pigment is titanium dioxide.

11. An improved composition according to claim 1 wherein said vinyl chloride polymer is a homopolymer.

* * * * *